US008714986B2

(12) United States Patent
Dodelson et al.

(10) Patent No.: US 8,714,986 B2
(45) Date of Patent: May 6, 2014

(54) SYSTEM AND METHOD FOR PROVIDING DIFFERENTIATED CONTENT BASED ON SKILL LEVEL

(75) Inventors: Saki Dodelson, Lakewood, NJ (US); Susan Gertler, Teaneck, NJ (US); Rivki Locker, Lakewood, NJ (US)

(73) Assignee: Achieve3000, Inc., Lakewood, NJ (US)

( * ) Notice: Subject to any disclaimer, the term of this patent is extended or adjusted under 35 U.S.C. 154(b) by 908 days.

(21) Appl. No.: 11/920,087

(22) PCT Filed: Aug. 31, 2006

(86) PCT No.: PCT/US2006/034231
§ 371 (c)(1),
(2), (4) Date: Nov. 8, 2007

(87) PCT Pub. No.: WO2008/027053
PCT Pub. Date: Mar. 6, 2008

(65) Prior Publication Data
US 2009/0311657 A1 Dec. 17, 2009

(51) Int. Cl.
*G09B 7/00* (2006.01)
(52) U.S. Cl.
USPC ........... 434/323; 434/322; 434/350; 434/118; 434/307; 709/206; 715/752
(58) Field of Classification Search
USPC .......... 434/350, 118, 322, 323, 307; 709/206; 715/750
See application file for complete search history.

(56) References Cited

U.S. PATENT DOCUMENTS

| | | | |
|---|---|---|---|
| 6,606,480 B1 * | 8/2003 | L'Allier et al. | 434/362 |
| 6,626,679 B2 | 9/2003 | Skeans et al. | |
| 7,493,077 B2 * | 2/2009 | Coleman et al. | 434/350 |
| 2003/0054328 A1 * | 3/2003 | Stuppy et al. | 434/350 |
| 2004/0110119 A1 * | 6/2004 | Riconda et al. | 434/350 |
| 2005/0158697 A1 * | 7/2005 | Nelson et al. | 434/350 |
| 2005/0239032 A1 * | 10/2005 | Hartenberger | 434/322 |
| 2005/0287509 A1 * | 12/2005 | Mohler | 434/350 |
| 2006/0234201 A1 * | 10/2006 | Pierson et al. | 434/323 |
| 2007/0231780 A1 * | 10/2007 | Shulman | 434/350 |
| 2008/0131863 A1 * | 6/2008 | Stuppy | 434/362 |

FOREIGN PATENT DOCUMENTS

| | | |
|---|---|---|
| KR | 10-2000-0030514 A | 6/2000 |
| KR | 10-2002-0048679 A | 6/2002 |

OTHER PUBLICATIONS

International Search Report mailed Jun. 1, 2007 for PCT Application No. PCT/US2006/034231.
Written Opinion of the International Searching Authority mailed Jun. 1, 2007 for PCT Application No. PCT/US2006/034231.
International Preliminary Report on Patentability mailed Mar. 12, 2009 for PCT Application No. PCT/US2006/034231.

* cited by examiner

*Primary Examiner* — Nikolai A Gishnock
*Assistant Examiner* — Banafsheh Hadizonooz
(74) *Attorney, Agent, or Firm* — Moser Taboada

(57) ABSTRACT

A system and method is disclosed for providing differentiated content to a user comprising determining a skill level of the user, obtaining unmodified content, aligning the unmodified content to a set of content standards, modifying the aligned content in accordance with the user's skill level, providing the modified aligned content to the user, re-assessing the user's skill level based on a response from the user to the modified aligned content, and modifying new aligned content in accordance with the re-assessed user's skill level.

42 Claims, 12 Drawing Sheets

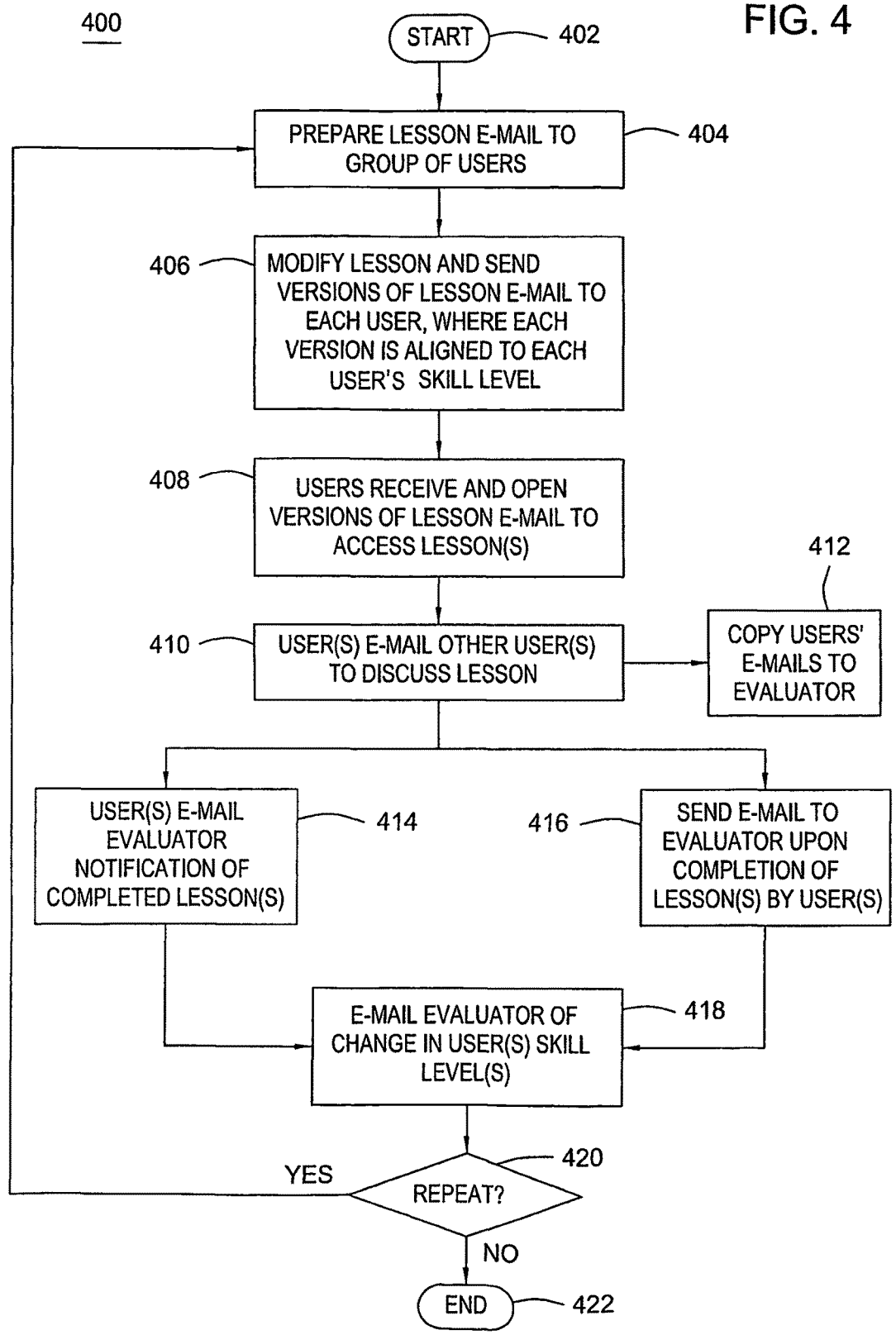

Schools Are Getting Healthy

— 502

ST. PAUL, Minnesota A new law says that schools must help kids eat good foods and exercise. The schools must set goals before this fall.
— 504

Why was the new law made? Kids who eat unhealthy foods may be overweight. They may also miss more school. Also, some kids eat too much sugar. Then, they have trouble paying attention at achool. The law does not tell schools what to change. Each school district can decide what to change.
— 504

Some schools are making changes in the lunchroom. They will serve only healthy foods. Others are doing more. St. Paul, Minnesota, has new drink machines. They will only hold water, fruit juice, and milk. Schools in Cape Girardeau, Missouri, will no longer have candy. In Farmington, Utah, schools will have recess before lunch. Then, kids won't rush through lunch to go play. Some districts will not allow teachers to keep kids in at recess. Why not? They say that kids need time to play.

Schools see some promblems with the new law. The schools did not reveive any money to make the changes. Also, many schools say that they will lose money. Why? They can no longer sell candy and soda. In addition, nothing happens to schools that do not meet the new goals.

Will the new law help kids be healthier? People must wait and see.

*Information for this story came from AP.*

Dictionary attention (*noun*) 🔊 looking or listening carefully
district (*noun*) 🔊 a group of schools in one area ⎬ 506
goal (*noun*) 🔊 something that a person wants to get done

File  Edit  View  Favorites  Tools  Help

News

Standards

Schools Are Getting Healthy
NJ Core Curriculum Content Standards
Language Arts Literacy

3.1: Reading. All students will understand and apply the knowledge of sounds, letters, and words in written English to become independent and fluent readers, and will read a variety of materials and texts with fluency and comprehension.

- 3.1.4.A: Concepts about Print/Text
    - 3.1.4.A.3: Identify and locate features that support text meaning (e.g., maps, charts, illustrations).
- 3.1.4.D: Fluency
    - 3.1.4.D.2: Read at different speeds using scanning, skimming, or careful reading as appropriate.
- 3.1.4.E: Reading Strategies (before, during, and after reading)
- 3.1.4.F: Vocabulary and Concept Development
    - .3.1.5.F.2: Infer specific word meanings in the context of reading passages.
    - .3.1.4.F.3: Identify and correctly use antonyms, synonyms, homophones, and homographs
    - .3.1.4.F.4: Use a grade-appropriate dictionary (independently) to define unknown words.
- 3.1.4.G: Comprehension Skills and Response to Text
    - .3.1.4.G.3: Cite evidence from text to support conclusions.
    - 3.1.4.G.13: Read regularly in materials appropriate for their independent reading level.
    - 3:1.4.G.2: Distinguish cause and effect, fact and opinion, main idea and supporting details in nonfiction texts (e.g., science, social studies).

3.2: Writing. All students will write in clear, concise, organized language that varies in content and form for different audiences and purposes.

- 3.2.4.A: Writing as a Process (prewriting, drafting, revising, editing, and postwriting)

| Class: Grade6 | | Grade6 | | | | | | | |
|---|---|---|---|---|---|---|---|---|---|
| | | Sep 05 | | Oct 05 | | Nov 05 | | Dec 05 | |
| User | Read Level | Total MC News Activities | Average Monthly Score | Total MC News Activities | Average Monthly Score | Total MC News Activities | Average Monthly Score | Total MC News Activities | Average Monthly Score |
| 1 Boyd, Frances | 5.2 / 815L | 27 | 55% | 21 | 47% | 36 | 74% | 32 | 80% |
| 2 Boyd, Scott | 6.1 / - | 21 | 41% | 21 | 45% | 20 | 50% | 20 | 66% |
| 3 Brock, Zander | 3.2 / 537L | 21 | 47% | 22 | 50% | 21 | 53% | 20 | 58%* |
| 4 Heuser, Ashley | 9-10 / 1200L | 21 | 47% | 21 | 49% | 20 | 52% | 21 | 64%* |
| 5 Perez, Siarra | 6.1 / 857L | 14 | 52% | 13 | 52% | 12 | 53% | 13 | 64%* |
| 6 Test, Test | 4.1 / - | 21 | 47% | 21 | 49% | 20 | 52% | 20 | 54% |
| 7 User, New | 4.1 / - | 21 | 47% | 21 | 49% | 20 | 52% | 20 | 54% |
| Class: Grade6 - Total Users: 7 | | 146 | 48% | 140 | 49% | 149 | 55% | 146 | 63% |

| Curriculum: Language Arts — 702 | | Sections: Language Arts | | Level: Performance Objective | |
|---|---|---|---|---|---|
| Class: Grade6 — 704 | | Grade6 | | Room No: Grade6 | |
| 706 | 708 | 710 | 712 | 714 | 716 |
| User | Read Level | Questions Completed | Student has demonstrated mastery Score: 80 - 100% | Additional practice recommended Score: 65 - 80% | Aggressive intervention strongly recommended Score: < 65% |
| Boyd, Frances | 5.2 / 815L | 579 | Concept 1: | | |
| Boyd, Scott | 6.1 / - | 381 | Concept 1: | | |
| Brock, Zander | 3.2 / 537L | 419 | Concept 4: Concept 1: | | |
| Heuser, Ashley | 9-10 / 1200L | 472 | Concept 1: | | Concept 4: |
| Perez, Siarra | 6.1 / 857L | 403 | Concept 1: | | Concept 1: |
| Test, Test | 4.1 / - | 269 | Concept 4: | | Concept 1: |
| User, New | 4.1 / - | 290 | Concept 4: | | |

Snapshot of all standards
Jan 5, 2006 - Feb 5, 2006

FIG. 7

Export to Excel    Print Report

Analysis of a particular standard
*Jan 5, 2006 - Feb 5, 2006*

Curriculum: Language Arts —— 802          Sections: Language Arts

Standard: READING
Concept: Strand 3:: Comprehending Informational Text                              } 804
Performance Objective: Concept 3:: Persuasive Text
Explain basic elements of argument in text and their relationship to the author's purpose and use of persuasive strategies.

Class: Grade6 —— 806          Grade: 6          Room No: Grade6

| User 808 | Read Level 810 | Questions Completed 812 | Average Score* 814 | Recommendation 816 | Additional Activities that cover this Performance Objective<br>click *Article* to preview - Click *Assign* to assign article to student |
|---|---|---|---|---|---|
| Boyd, Frances | 5.2 / 815L | 661 | 77 | Additional practice recommended. | News > Demo > Essay<br>Packing Up    Assign<br>818 |
| Boyd, Scott | 6.1 / - | 391 | 63 | Aggressive intervention strongly recommended. | |
| Brock, Zander | 3.2 / 537L | 464 | 60 | Aggressive intervention strongly recommended. | |

SYSTEM AND METHOD FOR PROVIDING DIFFERENTIATED CONTENT BASED ON SKILL LEVEL

CROSS-REFERENCE TO RELATED APPLICATIONS

This application claims benefit of PCT Patent Application, International Application No. PCT/US2006/034231, International Filing Date 31 Aug. 2006, which is herein incorporated by reference.

BACKGROUND

1. Field of the Invention

Embodiments of the present invention generally relate to a system and method for providing instructional material to users, and more specifically, to a web-based system and method for providing customized instructional material to a plurality of users, where the instructional material is modified to match each skill level of each user.

2. Description of the Related Art

Existing instructional methods and tools available today are rigid and not structured to meet the requirements of a particular user. For example, in most classroom settings, a student is placed in a grade level that is initially based on the age of the student. An assessment test may be given to determine where to place the student within a particular subject level if the school offers multiple levels within one grade. For example, an English course may include a remedial level, an average or "regular" level, and an advanced or "honor" level. Once the student is placed within a particular course level, the student, along with the rest of the class, is given a series of lessons taken from a lesson plan chosen by the instructor, which may or may not be approved by a faculty head. The student may be tested periodically and, at the end of a school year, the instructor, or evaluator, will give the student a grade, which should be indicative of the student's proficiency in the course.

If the student receives a passing grade, then he or she may advance to the next level. If the student fails the course, then the student must repeat the course. If the student fails too many courses, the student may be required to repeat the grade. In some grade school systems, the student may take remedial courses during the summer break between school years which, if successfully completed, allow the student to continue to the next level. A lesson plan is rarely, if ever, modified to accommodate the proficiency or skill level of a particular student, or even for a small group of students.

Because of the sheer number of students and the lack of resources available, class sizes typically prevent meaningful one-on-one interaction between an instructor and a student. The more fortunate students who are struggling with the subject matter may get private tutoring or help from family or friends. The students who excel in a particular subject matter typically receive the top grades and usually have to wait until the following school year to advance to the next grade level. These gifted students may lose interest in the certain courses because of the lack of intellectual stimulation. In addition, in today's schools, many students come from different cultural and social backgrounds and English may not be their first language. Thus, a language barrier may exist, adding another level of difficulty and frustration for both the English-speaking and non-English speaking students, and their instructor.

Educators take these factors into consideration, in addition to others, in developing instructional and educational programs. For example, various governing bodies, such as state and local school boards, establish educational requirements or recommendations. The educational requirements or recommendations are typically embodied in formal guidelines or standards. Such requirements or recommendations will be referred to herein as "educational standards." Educators are encouraged, or required, to incorporate the educational standards in their educational plans.

To assist the educators, educational resource providers, such as textbook providers, generate resources that substantially correlate to the educational standards. The resource providers presently attempt to perform this correlation by obtaining the educational standards and, in a subjective determination by the resource provider, design resources correlated to the educational standards. For example, a textbook company creates social studies textbooks for a sixth grade skill level in accordance with state educational standards for sixth grade students. However, these resources may not include all the material preferred by an educator for a specific subject. In addition, resources quickly become outdated and do not take into account differences in skill levels between students within a grade level. Although the resources may be aligned to the appropriate educational standards, not all students in a class may be at the same education skill level. Thus, teaching from one textbook for a particular grade level may not be an efficient method of teaching, and may leave some students behind. Teachers do not have time to allow students to repeatedly practice the skills necessary to advance their skill levels, since the teachers must progress through a range of subject matter in accordance with educational standards. Thus, students do not necessarily receive enough time to perform exercises to increase their skill levels.

Additionally, students often are pressured to meet educational requirements to advance to the next grade level, regardless of whether the students' skill levels have advanced. However, in a given grade level of students, a majority of the students may test lower in skill levels than the given grade. Thus, a teacher will provide learning material that is aligned to the lower skill level, which may not necessarily meet the educational requirements specified for grade level.

With the vast use of networked technologies, such as the Internet and the World Wide Web, new teaching tools and methods have been created to assist educators. Some classrooms are equipped with computer workstations. However, most of the teaching tools and methodologies used with computers today adopt the classic classroom paradigm described above.

The LEXILE Framework for Reading (MetaMetrics, Inc.) includes a method for analyzing reading material using, primarily, the word frequency and sentence lengths in a predetermined block of text. LEXILE then assigns a LEXILE Score to the text based on a predetermined scale. The LEXILE Framework also provides assessment tests for students and provides a LEXILE score for each student. Educators may use the LEXILE system to match a student's LEXILE score to appropriate reading material with the same LEXILE score. However, this system merely matches specific reading content to students with certain skill levels. An educator using the LEXILE system typically cannot use one learning resource or textbook for a class, but rather has to provide multiple materials to meet each student's assessed skill level. This is a burdensome task for the educator.

Thus, there is a need for a learning tool that allows a user to progress in the learning of a subject matter in a manner suited, customized or adapted for that particular user. There is a need for such a learning tool that does not demand the extensive resources required for one-on-one or small classroom settings. There is also a need for a learning tool that continuously assesses the learning progress of an individual user and customizes learning content suited the particular user while also aligning the learning content with applicable educational standards.

SUMMARY

An embodiment of the present invention includes a method for providing differentiated content to a user, comprising the steps of providing a first set of questions to the user, receiving a first set of answers related to the first set of questions from the user, analyzing the first set of answers to produce a first skill level associated with the user, obtaining a first unmodified content from at least one source, modifying the first unmodified content in accordance with the first skill level of the user to produce a first modified content, generating a second set of questions related to the first modified content, presenting the first modified content and the second set of questions to the user, receiving a second set of answers related to the second set of questions from the user, analyzing the second set of answers to produce a second skill level associated with the user, obtaining a second unmodified content from at least one source, and modifying the second unmodified content in accordance with the second skill level to produce a second modified content.

Another embodiment of the present invention includes a method for providing content to a plurality of users, where the content provided to each user is the same in information but customized in presentation in accordance with a skill level of each user, comprising the steps of providing a first set of questions to the plurality of users, receiving a plurality of first sets of answers related to the first set of questions, wherein each first set of answers is associated with each user of the plurality of users, analyzing each first set of answers of the plurality of first sets of answers to produce a plurality of first skill levels, wherein each first skill level is associated with each user, obtaining a first unmodified content from at least one source, modifying the first unmodified content to produce a plurality of versions of first modified content, wherein each version of first modified content is associated with each first skill level associated with each user, generating a plurality of second sets of questions wherein each second set of questions is related to each version of first modified content, matching each version of first modified content and each second set of questions to each first skill level associated with each user, and presenting each matched version of first modified content and each matched second set of questions to each user of the plurality of users.

Another embodiment of the present invention includes a computer system for providing differentiated content to a user comprises at least one central processing unit, at least one set of support circuits, a first server comprising a differentiation engine, wherein the differentiation engine comprises a profile database for storing a user profile, and an assessment application to perform the functions of developing a user profile, wherein the user profile comprises learning characteristics of the user, assessing a plurality of skill levels associated with the user, and preparing customized content based on the plurality of skill levels, and a second server comprising a standards engine communicatively connected with the differentiation engine, wherein the standards engine comprises a standards database for storing a plurality of sets of content standards, an intermediate standards database for storing a plurality of sets of intermediate standards, and an alignment application to perform the functions of obtaining unmodified content, and applying a set of intermediate standards to align the unmodified content to a set of content standards from the plurality of sets of content standards.

In yet another embodiment of the present invention, a computer system for providing differentiated content to a user comprising a central processing unit, a set of support circuits, and a server, wherein the server stores and maintains a memory comprising, at least one operating system, a differentiation engine, a communication engine interfacing with the differentiation engine, a standards engine interfacing with the differentiation engine, and a feedback engine interfacing with the differentiation engine, the communications engine, and the standards engine, is provided.

Another embodiment of the present invention includes a computer-readable memory medium storing executable code for implementing a method to provide differentiated content to a user on a computer, wherein the method comprises the steps of providing a first set of questions to the user, receiving a first set of answers related to the first set of questions from the user, analyzing the first set of answers to produce a first skill level associated with the user, obtaining a first unmodified content from at least one source, modifying the first unmodified content in relation to first skill level of the user to produce a first modified content, generating a second set of questions related to the first modified content, presenting the first modified content and the second set of questions to the user, receiving a second set of answers related to the second set of questions from the user, analyzing the second set of answers to produce a second skill level associated with the user, obtaining a second unmodified content from at least one source, and modifying the second unmodified content in relation to the second skill level to produce a second modified content.

Another embodiment of the present invention includes a computer-readable memory medium storing executable code for implementing a method to provide content to a plurality of users, where the content provided to each user is the same in information but customized in presentation in accordance with a skill level of each user, wherein the method comprises the steps of providing a first set of questions to the plurality of users, receiving a plurality of first sets of answers related to the first set of questions, wherein each first set of answers is associated with each user of the plurality of users, analyzing each first set of answers of the plurality of first sets of answers to produce a plurality of first skill levels, wherein each first skill level is associated with each user, obtaining a first unmodified content from at least one source, modifying the first unmodified content to produce a plurality of versions of first modified content, wherein each version of first modified content is associated with each first skill level associated with each user, generating a plurality of second sets of questions wherein each second set of questions is related to each version of first modified content, matching each version of first modified content and each second set of questions to each first skill level associated with each user, and presenting each matched version of first modified content and each matched second set of questions to each user of the plurality of users.

BRIEF DESCRIPTION OF THE DRAWINGS

So the manner in which the above recited features of the present invention may be understood in more detail, a more particular description of the embodiments of the present invention, briefly summarized above, may be had by reference to embodiments, some of which are illustrated in the appended drawings. It is to be noted, however, the appended drawings illustrate only typical embodiments of the present invention and are therefore not to be considered limiting of its scope, for the present invention may admit to other equally effective embodiments, in which:

FIG. 4 presents a method for providing differentiated content to users, in accordance with an embodiment of the present invention;

FIGS. 5A-5E illustrate user interfaces associated with a system for providing differentiated content, based on multiple levels of skill, in accordance with an embodiment of the present invention;

FIG. 6 is a progress report of multiple users using differentiated learning content, based on multiple levels of skill, in accordance with an embodiment of the present invention;

FIG. 7 is a progress report of multiple users' performance in relation to different educational standards; and FIG. 8 is a report of multiple users' performance in relation to a single educational standard, in accordance with an embodiment of the present invention.

DETAILED DESCRIPTION

Figure 1:
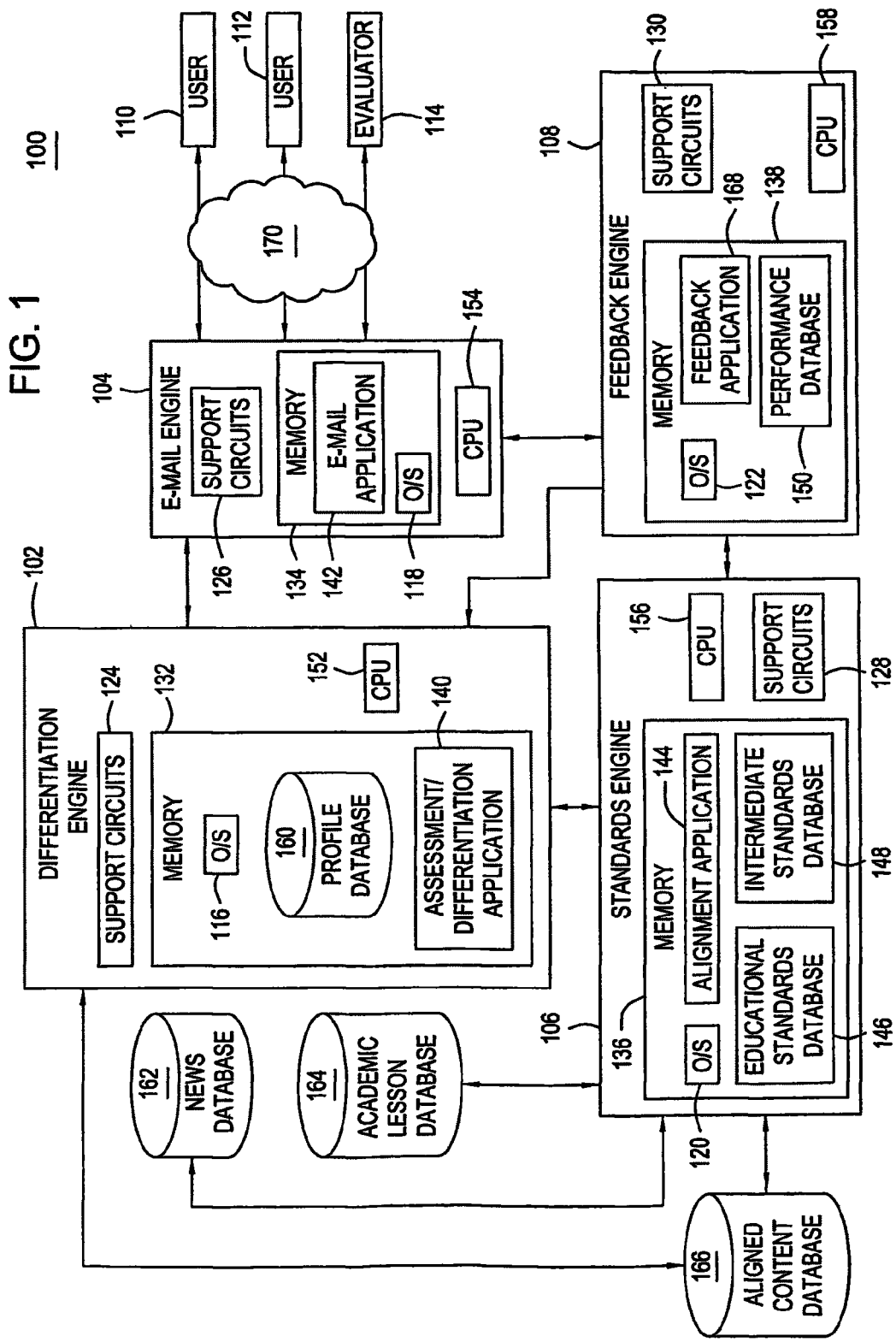
FIG. 1 is a system for providing differentiated content based on multiple levels of skill, in accordance with an embodiment of the present invention.

FIG. 1 presents an embodiment of the present invention depicting a system 100 for providing differentiated content to a plurality of users based on associated levels of skill. System 100 comprises a differentiation engine 102, an electronic mail ("e-mail") engine 104 to function as a communications engine, a standards-engine 106, and a feedback engine 108. Each engine 102, 104, 106, and 108 comprises a central processing unit (CPU) 152, 154, 156, and 158, support circuits 124, 126, 128, and 130, and a memory 132, 134, 136, and 138, respectively. The CPU 152, 154, 156, 158 may comprise one or more conventionally available microprocessors. The support circuits 124, 126, 128, 130 are well known circuits that comprise power supplies, clocks, input/output interface circuitry, and the like. Embodiments of the present invention encompass each engine 102, 104, 106, and 108 maintained on a single server, or on multiple servers, where a server may be any type of computing device adapted to distribute data and process data requests.

Memory 132, 134, 136, 138 may comprise any random access memory, read only memory, removable disk memory, flash memory, and various combinations of these types of memory. The memory 132, 134, 136, 138 is sometimes referred to as main memory and may in part be used as cache memory or buffer memory. The memory 132, 134, 136, 138 stores various software packages and components, such as an operating system (O/S) 116, 118, 120, and 122, respectively. The memory may be stored on any computer-readable medium, including, but not limited to, any data storage device readable by a computer, whether volatile, non-volatile, or implemented electronically or otherwise, known in the art, including floppy disks, hard disks, CD-ROMs, DVDs, flash memories, non-volatile ROMs, and RAMs.

The assessment and differentiation application 140 comprises modules for assessing and re-assessing skill levels of users who interact with the system 100. The memory 132 also may include a database 160 for storing and maintaining user profiles. Each user profile may include user identification information, learning characteristics of a user, interests of a user, and an assessment of skill levels in a multiple subject matter areas.

The memory 132 of the differentiation engine 102 comprises an assessment and differentiation application 140 comprising modules for obtaining aligned content and matching the aligned content to a skill level of a user 110, 112. The assessment and differentiation application 140 also includes a module for preparing lesson plans for each user 110, 112, where each lesson plan includes the aligned content and lesson exercises appropriate for the skill level(s) of the user 110, 112. An embodiment of the present invention includes the assessment and differentiation application 140 obtaining the aligned content and matching it to the user's skill level in real-time, where the application 140 obtains the aligned content as soon as it is available, and matches the aligned content substantially immediately. Another embodiment of the present invention includes the assessment and differentiation application 140 obtaining the aligned content and matching the content to the user's skill level at preset periods of time, such as hourly, daily, monthly, and the like.

Aligned content is based upon unmodified content that is aligned to applicable content standards, for example, educational standards. The application 140 obtains the aligned content and modifies the aligned content to match at least one skill level associated with a user profile stored in database 160. The differentiation engine 102 may obtain the aligned content from a database 166 internal or external to the system 100. In another embodiment, the differentiation engine 102 may obtain aligned content by interfacing with the standards engine 106. In yet another embodiment of the present invention, the memory 132 comprises a database (not shown) for storing the modified aligned content.

The memory 134 of the e-mail engine 104 comprises an e-mail application 142 including modules for e-mailing content to users of the system 100. Users 110 and 112 and evaluators 114 may access the system 100 through the e-mail engine 104. Users 110 and 112 may communicate with each other using the e-mail engine 104 and may communicate with any other user associated with a group associated with the user 110, 112. For example, a student may e-mail any other student in his or her grade, his or her school, or his or her school district, depending on the communication boundaries set by the evaluator 114. Further, the evaluator 114 may use the e-mail engine 104 to provide lessons comprising modified content to a user 110, 112 or to a group of users.

The e-mail application 142 may edit the content and format of an e-mail using a skill level of the intended recipient to prepare and deliver a customized e-mail message. The e-mail application 142 may prepare a plurality of customized e-mail messages covering the same subject matter for delivery to multiple recipients. For example, the evaluator 114 may compose an e-mail message to be sent to both users 110 and 112, each having different associated skill levels. The e-mail engine 104 interfaces with the differentiation engine 102 to obtain the skill levels associated with users 110 and 112, and edits the content and format of the original e-mail from the evaluator 114 to produce a customized version of the evaluator's original e-mail for each user 110, 112, where the presentation of the e-mail is appropriate for the skill level of each user 110, 112. Thus, user 110 will receive an e-mail from evaluator 114 modified to meet his or her specific skill level, and user 112 will receive an e-mail from evaluator 114 modified to meet his or her specific skill level.

The memory 136 of the standards engine 106 comprises at least one database 146 for storing a plurality of educational standards, such as state academic standards, local district academics standards, and the like. The memory 136 comprises another database 148 for storing a plurality of intermediate content standards that the system uses to align unmodified content to the plurality of educational standards.

The memory 136 of the standards engine 106 also comprises an alignment application 144 that includes modules for aligning unmodified content to educational standards stored in database 146 using the intermediate content standards stored in database 148.

The standards engine 106 interacts with at least one content source to query for and obtain unmodified content, such as, for example, news articles, textbook excerpts, library journals, and the like. For example, the standards engine 106 may interact with a news database 162 and an academic lessons database 164. In an embodiment of the present invention, the alignment application 144 queries the news database 162 to obtain news articles to be aligned to the educational standards stored in the database 146 and developed into differentiated learning lessons by the differentiation engine 102. An aspect of this embodiment includes the alignment application 144 querying for and obtaining news articles, on a periodic basis, such as a daily basis, to create new aligned content. Another embodiment of the present invention includes the alignment application 144 querying for and obtaining unmodified content substantially continuously and aligning the unmodified content to the applicable educational standards in real-time. Another embodiment of the present invention includes the alignment application 144 periodically updating the educational standards stored in the database 146.

Upon obtaining the unmodified content, the alignment application 144 may align the unmodified content to the applicable content standards stored in database 146 using the intermediate standards stored in database 148. The aligned content then may be stored in a database 166. The database 166 may be maintained external to the system 100, such as, for example, on a storage area network. In another embodiment of the present invention, a database 166 for storing aligned content is maintained within the memory 136 of the standards engine 106. The standards engine 106 interacts with the differentiation engine 102 to provide access to the aligned content database 166, which the differentiation engine further modifies using the assessment and differentiation application to customize the aligned content in accordance with different skill levels of users, such as, users 110 and 112.

In another embodiment of the present invention, a standards engine 106 includes a memory 136 with a database for storing both the educational standards and the intermediate standards. In yet another embodiment, at least one content standards database is maintained externally to the system 100, such as, for example, on a storage area network. A standards engine 106 interfaces with this external database to utilize the stored content standards data.

The memory 132 of the feedback engine 108 comprises a performance database 150 that stores performance and progress data associated with each user 110, 112 of the system 100. The memory 138 also may comprise a feedback application 168 having modules for generating performance and progress data associated with a user 110, 112 of the system 100. For example, an embodiment of the present invention includes the feedback application 168 generating a progress report of a user 110, 112 regarding the user's performance on a customized lesson provided by the differentiation engine 102. The progress report also may track the user's 110, 112 performance in each subject matter in relation to the educational standards stored in the database 146, and in relation to other users 110, 112, using feedback and performance data stored in the performance database 150.

Via the feedback application. 168, the feedback engine 108 may interface with the standards engine 106 to access the standards database 146 for tracking the performance of a user 110, 112 in comparison with one or more educational standard stored in the database 146. The feedback engine 108 also interfaces with the differentiation engine 102 to access the profile database 160 and associate performance reports of a user 110, 112 with the user's stored profile. The feedback application also includes modules for providing performance and progress data to a user 110, 112 or evaluator 114 of the system using the e-mail engine 104.

A user 110, 112 may access the system 100 via the e-mail engine 104 through a communications network 170. A user may use a common computer or any communications device to access the system 100 and the communications network 170 may be any conventional network, such as an Ethernet network, a fiber channel network, or a wide area network (WAN) that provides either a direct, or indirect (e.g., Internet access via a wired or wireless connection, or public switched telephone network (PSTN)) connection between the user 112 and the system 100.

In the present embodiment, the system 100 is a stand-alone system maintained using one or more servers and one or more computing devices. Other embodiments of the present invention comprise incorporating system 100 into another system, such as, for example, a local school district system or a statewide educational system. The system is not limited to a specific operating system, but may be adapted to run on any operating system, including, but not limited to, LINUX and Microsoft WINDOWS.

Although the system 100 of this particular embodiment is described to be used as an educational tool, the scope of the present invention encompasses other embodiments comprising a system 100 to be used as an assessment and learning tool in any area of skill. Embodiments of the present invention encompass multiple types of users, such as, an educational student using the system 100 to receive educational lessons, a job applicant using the system for job training, or any person being assessed for a certain level of skill and receiving content based on their level of skill. An evaluator may be a teacher, an employer, or any person overseeing the utilization of the system 100 by a user 110, 112.

For example, an embodiment of the present invention comprises a differentiation system for assessing skill levels of job candidates and providing differentiated job training lessons aligned to applicable industry standards, where each lesson is customized to the learning levels of each job candidate of the system.

FIGS. 2 through 8 describe embodiments of the present invention related to a system for providing differentiated content where the content is used for teaching school-aged children. However, one of ordinary skill in the art would readily recognize that the scope of the present invention is not limited to embodiments pertaining to academic educational systems, but rather may encompass any system where differentiated content is provided to a user based on the assessed skill level(s) of the user.

Figure 2:
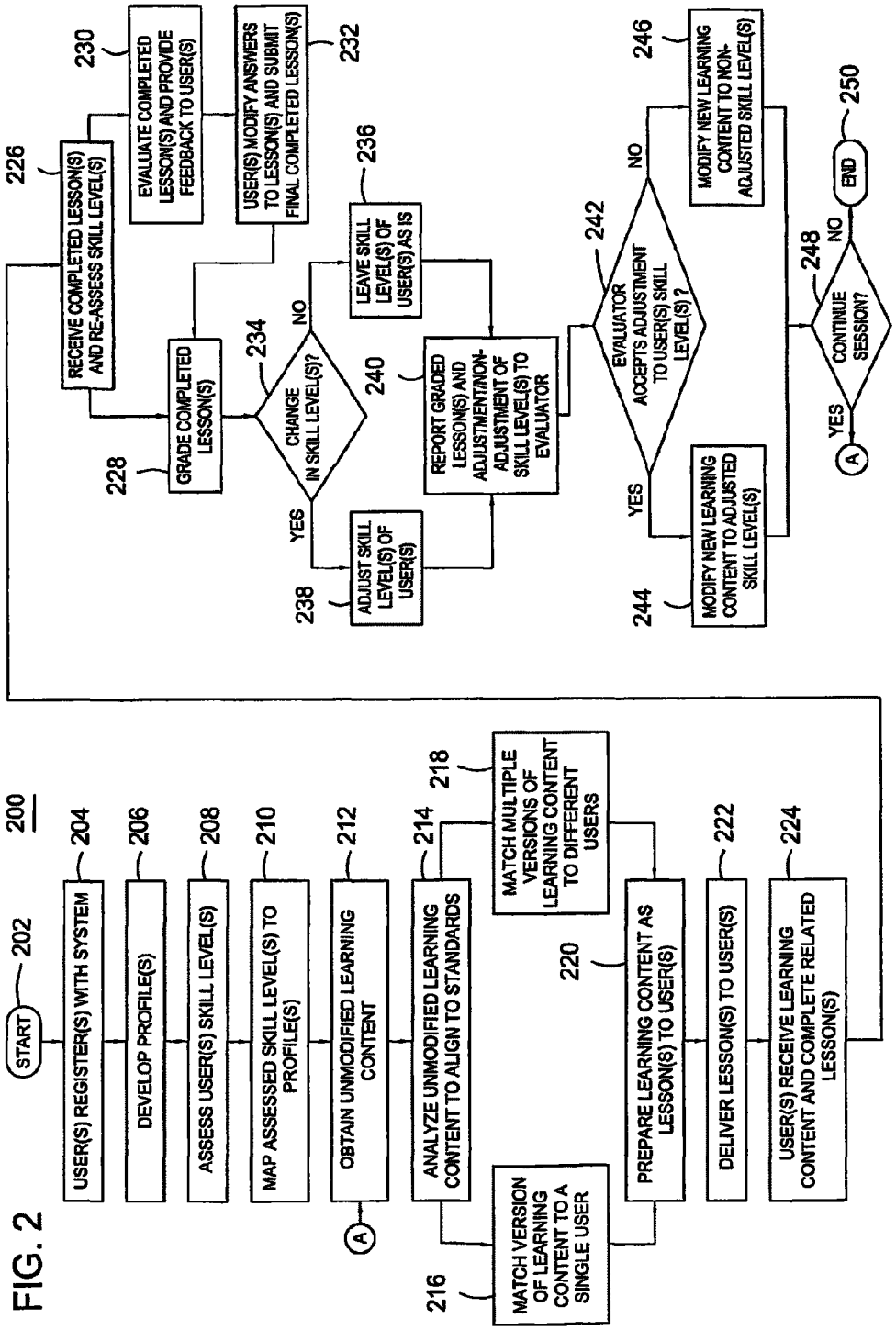
FIG. 2 presents a method for differentiating content based on multiple levels of skill, in accordance with an embodiment of the present invention.

FIG. 2 illustrates a flow diagram of a method 200 for using a system that provides differentiated academic content, in accordance with an embodiment of the system. The steps need not be in the sequence illustrated, and some steps may occur essentially simultaneously. This method may be performed using the system 100, including the differentiation engine 102, the e-mail engine 104, the standards engine 106, and the feedback engine 108, as described in the embodiment of FIG. 1. Using the system 100, the steps of the method 200 may occur in real-time, or the steps may occur at preset periodic intervals of time.

The method 200 begins at step 202 and progresses to step 204 where one or more users registers with the system 100. In this step, the user(s) may enter information such as, for example, grade level, contact information, personal interests, school district, and specific learning characteristics, such as, subject matter preferences, for example. The user(s) may access the system 100 using e-mail, such as, for example, through the email engine 104 described in the embodiment of FIG. 1, or may access the system 100 directly using, for example, an Internet web page associated with the system 100.

Upon receiving the entered information, at step 206, the system 100 develops a student profile associated with each user, and stores the profile in a database, such as, for example, the profile database 160 described in the embodiment of FIG. 1. At step 208, the system 100 assesses the skill level of the user(s) in one or more subject matters. To perform this step, the system 100 may, for example, deliver a set of questions to the user(s) in different subject matters, such as literacy, reading comprehension, vocabulary, and mathematics, and assess a skill level in each subject area based on a predetermined skill-level scale. For example, the system 100 may use the LEXILE Framework to assess a reading level associated with a number of users. The system 100 would then assign a LEXILE reading score to each user. In another embodiment of the present invention, the system 100 also assesses the fluency of each user in a specific language.

At step 210, the system 100 maps the assessed skill level(s) to each user's associated profile generated in step 206. The system 100 also may report the assessed users' skill levels to an evaluator associated with the user(s). The assessed skill level(s) may account for learning disabilities, handicaps, and any other conditions particular to a specific student.

Once the system 100 has assessed the skill level(s) of the users, the system 100 may create customized lesson plans for each user based upon each user's skill level(s). At step 212, the system 100 obtains unmodified (or raw) content to be developed into a lesson plan. The system 100 obtains the unmodified content from sources. The unmodified content includes, but is not limited to, textbook excerpts, periodical articles, news articles, literary excerpts, and the like. The unmodified content may come from any source, such as, for example, academic textbook, news sources, library databases, pre-developed lesson databases, and the like.

At step 214, the system 100 analyzes the difficulty level of the unmodified content in accordance with one or more educational standards, and aligns the unmodified content to the educational standards using a set of intermediate standards. In the present embodiment, the educational standards include, but are not limited to, state academic standards, local school district standards, and the like. At step 214, the system 100 produces multiple versions of the unmodified content, referred to herein as aligned content versions, each of which is substantially similar to the unmodified content in subject, meaning and context, but where each version of aligned content is aligned to a specific skill level associated with the educational standards.

For example, an embodiment of the present invention comprises a method for obtaining a news article on terrorism and aligning the news article to a set of educational standards for social studies by modifying the format and content of the original news article to produce aligned versions of the news article, where each version is associated with a specific skill level of the educational standards. For example, the system 100 may first obtain the news article and analyze the article against a set of state educational standards to determine the news article is appropriate for a high school reading comprehension level. The system 100 then creates an aligned content version of the unmodified news article for a second grade reading comprehension level by breaking up the article into shorter sentences and paragraphs, and rewriting the article using grade-appropriate vocabulary. In contrast, another example includes the system 100 creating an aligned content version of the unmodified news article for an eighth grade reading comprehension level by keeping the sentence lengths in the original article, but simplifying the vocabulary using appropriate grade level terms.

At step 216, the system 100 matches a specific version of the aligned content to a user using the user's pre-assessed skill level(s). The system 100 may modify further the matched aligned content version to increase comprehension of the aligned content version by the specific user. The 100 system matches a version of the aligned content to a user by matching specific areas of learning where the user exhibits a need for improvement, as assessed by the system 100 in step 208.

The system 100 also may match multiple aligned content versions to multiple users based upon each user's pre-assessed skill level(s), in step 218. Using the previous example, a system 100 may match multiple aligned versions of a news article on terrorism to multiple students in a current events class. Thus, each student receives an article covering the same terrorism subject matter, however, each student's version will be presented in a context and format customized to the student's skill level(s). The method of this embodiment provides for an unmodified learning content to be provided at multiple skill levels simultaneously, thereby providing for collaborative learning from the same unmodified learning content by many users of varying skill levels.

At step 220, the system 100 prepares one or more lesson plans associated with different versions of the aligned content. The lesson plans may include a set of lesson exercises, such as, for example, assessment questions and activities that relates in subject, context, and skill level to each version of the aligned content. An embodiment of the present invention includes a lesson plan comprising a set of vocabulary questions, an essay question for thinking comprehension, a set of mathematical exercises, a set of social studies questions, links to extended background material regarding the subject matter, games associated with the aligned content, and a user-based poll to prompt interactive discussion of the aligned content. Another embodiment of the present invention includes providing an editing checklist as part of an essay question in a lesson plan, where the checklist provides a list of editing items that a user should include in an essay answer. In step 220, the system 100 may modify each lesson plan to match the specific learning characteristics of each user, such as, for example, using a specific spoken language, using different size fonts for each lesson, using level-appropriate vocabulary, different graphics, and may provide an audible feature that "reads aloud" one or more portions of the lesson plan. An embodiment of the present invention includes a system 100 modifying each lesson plan by providing the aligned content in a combination of English and a foreign language depending upon a user's current level of progress in moving from the user's native non-English language to English. Thus, the system 100 aligns both the learning content and the context of the related lesson plan to each user's skill level(s).

In another embodiment of the present invention, the system 100 does not perform the function of preparing a lesson plan, in step 220, but proceeds to step 222, where the system 100 prepares to deliver the matched aligned version to each respective user.

In step 222, the system 100 prepares to deliver the lesson plans to each user using, for example, an e-mail system. The system 100 differentiates the context and format of each e-mail to customize the e-mail for each user. An embodiment of the present invention includes preparing differentiated e-mails and lesson plans to deliver a lesson to a group of users using each user's preferred spoken language, specific font sizes for better comprehension, specific graphics, and a customized format correlated to each user's skill level(s). Embodiments of the present invention include a system 100 that delivers lessons using e-mail wherein each e-mail includes a link to the lesson plan, includes a portion of the lesson plan, or includes the entirety of the lesson plan in the body of the e-mail.

In another embodiment of the present invention, a system 100 provides for an evaluator to generate a calendar of lesson plans related to a predetermined selection of unmodified contents or a predetermined selection of unmodified content subject matters, where the calendar covers a time period of an entire academic year. The evaluator may create the calendar in the system 100 using applications provided by the system 100. In an embodiment of the present invention, the evaluator may generate the calendar using a third party calendar application and load the calendar into the system 100. The system 100 then obtains unmodified content in accordance with the predetermined selection of unmodified contents or unmodified content subject matters, aligns the obtained unmodified content, and prepares lesson plans to be automatically delivered to the users at predetermined times, in accordance with the evaluator's calendar.

At step 224, each user receives his or her customized e-mail delivering a lesson plan. Using the e-mail, each user may access his or her customized lesson and begins to perform the associated lesson exercises. As each user completes each lesson exercise, the system 100 receives each user's inputs at step 226 and begins to dynamically re-assess the skill level(s) of each user.

Once each user completes the lesson exercise(s), each user may submit the completed lesson exercise(s) for grading. Grading may be performed by the system 100, as in step 228, and the results may be stored in a database and associated with each user's profile. In an embodiment of the present invention, at step 230, the system 100 evaluates each user's performance in real-time as each user completes each lesson exercise, and provides feedback of the completed lesson to each user, prior to entering a final grade. The system 100 may provide the feedback in step 230 using a feedback engine 108, as described in the embodiment of FIG. 1. At step 232, the feedback feature allows each user to modify the answers to the lesson exercises prior to submitting the completed lesson exercise(s) for final grading. An aspect of this embodiment includes providing the feedback feature to selected users of differing skill levels.

In another embodiment of the present invention, the system 100 may deliver the completed lesson exercise(s) to an evaluator of the user(s) for grading. The evaluator may enter the results of each graded lesson exercise into the system 100 for further evaluation and analysis by the system 100.

Once the completed lesson exercise(s) have been graded in step 228, the system 100 may determine whether an adjustment should be made to a user's skill level(s) based upon the completed lesson exercise(s), in step 234. If the system 100 determines the skill level assessed from the completed lesson is the same as the previous skill level of the user, in step 236, the system 100 does not adjust the skill level(s) associated with the user.

If the system 100 determines the skill level assessed from the completed lesson exercise(s) is different than the previous skill level of the user, the system 100 adjusts the appropriate skill level(s) of the user, at step 238. The system 100 is capable of providing continuous re-assessment of the user's skill level(s).

At step 240, the system 100 reports the results of the completed lesson exercise(s) and any adjustments to the skill levels of one or more users to the evaluator. An embodiment of the present invention includes reporting the results individually to an evaluator. That is, the results are reported as each user completes a lesson exercise. Another embodiment of the present invention includes reporting the combined results of a group of users to an evaluator, for example, in a tabular format. The evaluator may select the specific characteristics associated with a report for the system 100 to generate.

At step 242, the evaluator evaluates the completed lessons and suggested adjustments and non-adjustments to one or more skill levels of each user. The evaluator may accept the completed lessons and suggested skill level adjustments/non-adjustments, and at step 244, the system 100 prepares a new lesson plan for each user, accounting for adjustments to skill level(s) to customize the new lesson plan for each user.

The evaluator also may reject either the completed lesson(s) for one or more users and/or the adjusted skill level(s) provided by the system. The evaluator may consider conditions regarding a user's learning environment that are not available to the system 100. For example, the evaluator may be aware of a disruptive home, a loss of a user's family member, an emergency situation, and the like. If the evaluator does not accept the adjusted skill levels provided by the system 100, at step 246, the system 100 may prepare a new lesson customized to each user in accordance with each user's non-adjusted skill level(s).

At step 248, the system 100 determines whether a user's learning session should continue. If the user's learning session is at an end, for example, the user completes all lesson plans for a specific subject or within an allotted time period, the system 100 terminates the user's learning session at step 250. If, however, the system 100 determines the user's learning session should continue, the system 100 repeats the learning and evaluation process starting again with step 214.

Thus, the system of the embodiment described in FIG. 2 delivers differentiated content to each user that is aligned to the user's skill level(s), maintaining the same content topics, main ideas and core elements, and thereby providing evaluators with the ability to engage whole-class learning using individually differentiated content.

Figure 3:
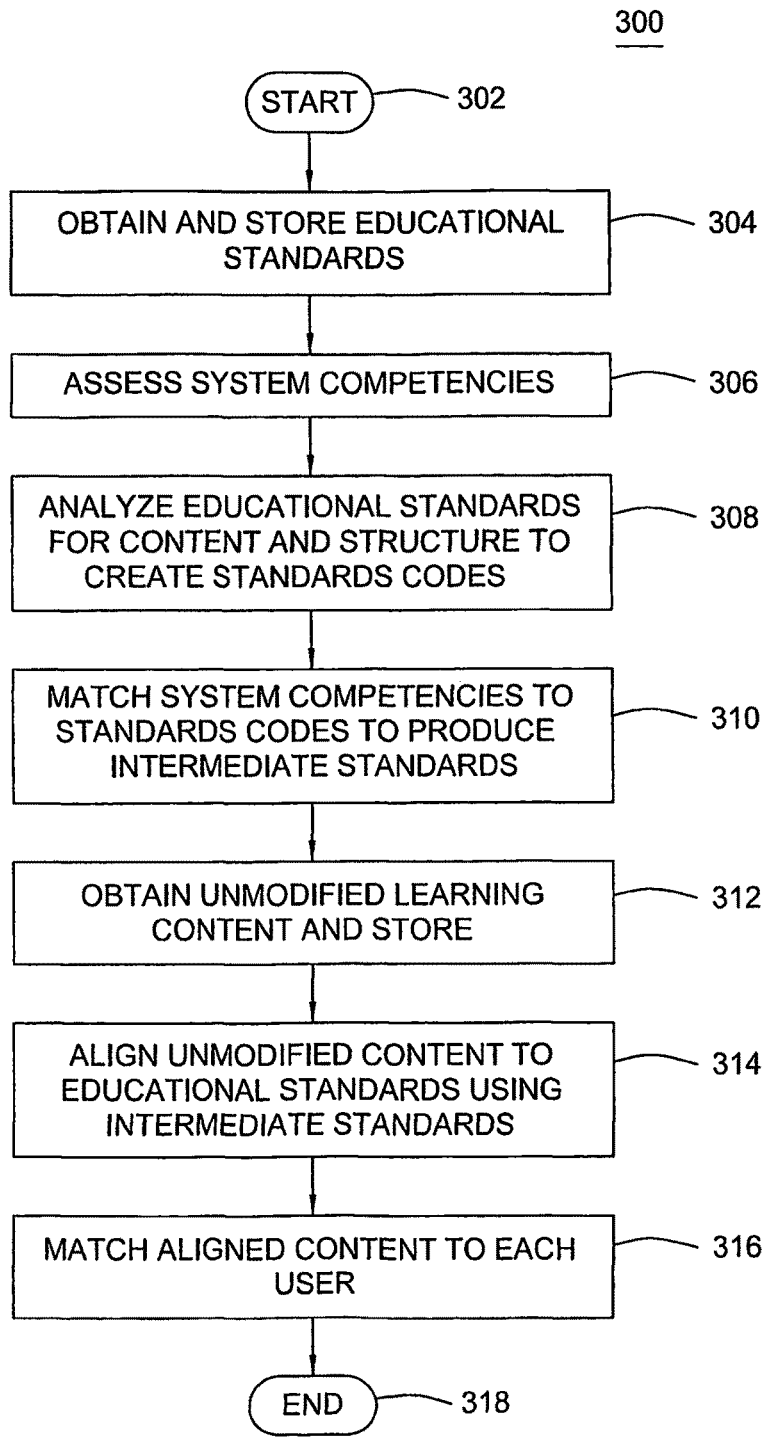
FIG. 3 presents a method for aligning content to multiple sets of content standards, in accordance with an embodiment of the present invention.

FIG. 3 presents a method 300 for aligning learning content to educational standards and differentiating the content to customize the content for multiple users, in accordance with an embodiment of the present invention. The method 300 illustrates steps that may be performed by a system 100 comprising a differentiation component 102 and a standards component 106, as described in the embodiment of FIG. 1. Using the system 100, the steps of the method 300 may occur in real-time, or the steps may occur at preset periodic intervals of time.

The method 300 begins at step 302 and progresses to step 304 where a system 100 for providing differentiated learning content obtains content standards and stores the standards in one or more databases, such as the educational standards database 146, described in the embodiment of FIG. 1. The content standards may be any type of accepted content standards used to align unmodified content to one or more skill levels.

At step 306, the system 100 performs a self-analysis and assesses the components and modules of the system 100, specifically, the differentiation engine 102, the e-mail engine 104, the standards engine 106, and the feedback engine 108. To perform the self-analysis, the system 100 assesses what technical functions and features each component of the system 100 includes at a particular time. The system 100 then produces a set of system competencies used by the system 100 to determine the types of unmodified content the system's components are capable of managing, the modifications may be made to the unmodified content when aligning the unmodified content to one or more educational standards, the modifications made to aligned content when the aligned content is matched to a user's skill level(s), and the types of lesson exercises included in a lesson plan related to the unmodified content.

For example, the system 100 may contain certain technology including voice to text recognition. When the system 100 performs the self-analysis, the system acknowledges the voice to text recognition technology and creates a system competency related to a lesson exercise that allows a user to execute the lesson exercise by "speaking" into a microphone connected to a computer. Thus, the system 100 acknowledges that such lesson exercises may be included in a lesson plan.

Another example includes adding a technology module to the system 100 as a new subject matter area for learning. When the system 100 performs the self-analysis, the system 100 acknowledges the technology module and creates one or more system competencies related to the technology module, such that the system 100 may obtain unmodified content related to technology and may generate lesson plans related to technology with lesson exercises for testing learning content related to technology. For example, the system 100 may obtain a new set of educational standards, such as the National Educational Technology Standards (NETS) generated by the International Society for Technology in Education (ISTE) to integrate into the system components, such as the standards engine 106. The system 100 then may obtain unmodified content related to technology, such as ethics in using the Internet, for example, and align the unmodified content to the NETS standards to generate lesson plans matched to the skill levels of the users.

An embodiment of the present invention includes a system 100 with a technology module that identifies the platform and the software applications of a user's computer when the user accesses the system 100. The system 100 then incorporates the identified platform and software applications data into one or more technology lesson plans for the user. For example, the lesson plan may test the user's knowledge of certain commands available in a specific application stored on the user's computer, as part of an exercise in a technology lesson plan.

The set of system competencies is stored in a competencies database (not shown). The competencies database may be edited and updated at any time, by the system 100 or by a system administrator, based upon updates or alterations to the system 100. For example, the system 100 may perform a self-analysis on a periodic basis or when new elements are added to the system 100. In this manner, the system 100 is a "self monitoring" system. When new features and capabilities are added and implemented, the system performs the self-analysis and updates the system competencies.

At step 308, the system 100 analyzes the content standards to develop an understanding of the similarities and differences between each content standard and each skill level to which the content standards apply. Specifically, the analysis includes, but is not limited to, an evaluation of the statements of the standards, the structure of the standards, the core meaning of the standards, the related and ancillary meaning of the standards, the learning mode referenced by the standards, the intent of the standards, and the related critical thinking, logical, philosophical, and pedagogical elements of the content standards. Based upon the system's analysis of the multiple elements of the content standards, the system 100 creates a unique numerical scheme output as a set of unique standards codes. The standards codes relate to one or more elements of the content standards as analyzed by the system 100. The system may store this analysis in a system database, such as an intermediate standards database 148, as described in the embodiment of FIG. 1.

At step 310, the system 100 performs a comparative analysis of the system competencies and the standards codes to match each system competency with one or more applicable standards code. Each match between a system competency and a standards code is an intermediate standard, to produce a set of intermediate standards. The system 100 uses the intermediate standards to align unmodified content with stored content standards. The system 100 may update the intermediate standards as the system competencies change or are re-assessed, or when the system 100 performs an analysis of different or updated content standards. The system 100 may update the intermediate standards in real time, or at preset periodic time intervals. The intermediate standards are stored in a system database, such as the intermediate standards database 148.

At step 312, the system 100 obtains and stores unmodified content from one or more sources, such as industry databases, learning databases, proprietary databases, newspapers, and the like. The system 100 may categorize the unmodified content according to subject matter, source, chronologically, and the like.

At step 314, the system 100 aligns the unmodified content to an applicable set of stored content standards using a set of intermediate standards. The system 100 may perform this analysis using an application, such as the alignment application 144. An embodiment of the present invention includes aligning the unmodified content to the applicable content standards using a hierarchical structure. The intermediate standards analyze not only the statements of the standards, but the structure of the standards, the intent behind the standards, which may be included as part of the standards, and the subtleties of the language of the standards.

In step 314, the system 100 develops multiple versions of the unmodified content where each version correlates to a specific hierarchical level of the content standards. The subject matter of each version is substantially the same as the unmodified content; however, each version includes a different presentation of the unmodified content. To develop the multiple versions, the system 100 substantially breaks down the unmodified content and builds a modified version of the unmodified content using skill level characteristics, such as appropriate vocabulary and sentence length. Links or "tags" may be attached to certain words within the modified version to map the aligned content with the applicable content standard. The system 100 may store the versions of the aligned content in a database, such as the aligned content database 166.

Once system 100 completes the alignment process, at step 316, the system 100 matches versions of aligned content to each user using skill levels associated with each user of the system 100. The system 100 may perform this function using an application, such as the differentiation application 140. The matched aligned content then may be used to develop one or more lesson plans for each user. The method may end at step 318. Another embodiment of the present invention includes a system 100 periodically repeating the method 300 to continually obtain new unmodified content to align to a set of applicable content standards. In yet another embodiment of the present invention, a system that continuously repeats method 300 is provided.

FIG. 4 illustrates a method 400 for providing differentiated aligned content to multiple users through an e-mail system, in accordance with an embodiment of the present invention. The method 400 illustrates steps that may be performed by a system 100 comprising a differentiation component and an e-mail component 104, such as the system described in the embodiment of FIG. 1. Using the system 100, the steps of the method 400 may occur in real-time, or the steps may occur at preset periodic intervals of time. Although this figure describes a method of communication using e-mail, the scope of the invention is not limited to an e-mail communication method, but includes other embodiments comprising methods of communication using text messaging, instant messaging, and any other type of electronic communication.

The method 400 begins at step 402 and proceeds to step 404, where a lesson plan is prepared for a group of users by an evaluator. Each user has a different skill level as assessed by the system 100, for example, by an assessment application 140 of the system 100. Embodiments of the present invention include users grouped by skill level, grade level, a specific school, a specific schooling district, and the like. In the present embodiment, the evaluator is a teacher. However, other embodiments include any type of evaluator who reviews a performance of one or more users of the system 100.

In step 404, the evaluator prepares a single e-mail to a group of users covering a specific lesson plan topic. The evaluator may include lesson plan content aligned to educational standards and stored in a system database, similar to the method described in the embodiment of FIG. 3. In another embodiment of the present invention, an evaluator may provide a link to a lesson plan prepared and stored by a system 100 similar to the method described in the embodiment of FIG. 2. The evaluator may include general instructions applicable to the group of students.

At step 406, the system 100 modifies the evaluator's e-mail to produce multiple versions of the evaluator's e-mail, where each version correlates to one or more skill level(s) of each user. For example, a system 100 may modify the body of the e-mail using level-appropriate vocabulary, level-appropriate sentence length, specific graphics, multiple languages, and the like. The system 100 also verifies that the aligned content or selected lesson plan correlates to the skill level(s) of each user.

At step 408, each user receives an e-mail version correlated to the users skill level(s), and opens the e-mail to access the learning content. Using the e-mail system, such as the email engine 104, each user may communicate with other users with an assigned group, such as, for example, a student, another evaluator, a school administrator, and the like, to discuss the lesson plan in his or her e-mail, at step 410. For example, a user may contact another user in his or her grade class to discuss the most recent lesson plan received in an e-mail. A user also may be restricted from using the e-mail engine 104 to communicate with anyone outside the user's assigned group(s), thereby limiting the use of the e-mail engine 104 to educational studies. In another embodiment, the system forwards a copy of each e-mail sent to a user to the user's parents, for their information and review. This allows the user's parents or guardian also to monitor their child's learning progress and completion of assigned lesson plans.

At step 412, the system 100 may send a copy of each e-mail sent by all users within a group to the group evaluator. This feature ensures that a user is not misusing the e-mail engine 104. An embodiment of the present invention includes language and content filters that may be applied to e-mail from one or more users. Another embodiment includes the evaluator choosing to receive copies of all e-mails sent by selected users.

At step 414, each user may notify the evaluator that he or she has completed a lesson plan, using the e-mail engine 104. In another embodiment of the present invention, the system 100 sends a notification to an evaluator when each user completes one or more lesson plans, at step 416. The evaluator then may access the system 100 and grade the completed lesson plan, or may allow the system 100 to grade the completed lesson plan and provide the graded results to the evaluator. This allows the evaluator to monitor the progress and performance of each user.

At step 418, the system 100 informs the evaluator that one or more skill levels associated with each user has been adjusted by the system. The evaluator may use the e-mail engine 100 to contact a specific user's parents or guardian to discuss the user's progress or lack thereof.

At step 420, the process may be repeated beginning at step 404 to prepare and deliver another lesson plan to the group of users. Alternately, the process may end at 422.

FIGS. 5A-5E present example graphic user interfaces for a differentiated lesson plan produced by a system for providing differentiating learning content, according to an embodiment of the present invention, such as the system 100 described in the embodiment of FIG. 1. In this embodiment, a system 100 obtains unmodified content from THE ASSOCIATED PRESS in the form of an article covering foods served at schools. The system 100 aligns the article to a set of educational standards and produces multiple versions of the article, where each version is aligned to a specific educational standard, similar to the method described in the embodiment of FIG. 3.

FIG. 5A illustrates a lesson plan 500 of the article for a fourth grade reading comprehension level, in accordance with the New Jersey Core Curriculum Content Standards for Language Arts Literacy. The lesson plan 500 includes a modified article 502 covering the relevant subject matter, with highlighted level-appropriate vocabulary words 504. An embodiment of the present invention includes a system 100 that provides the modified article 502 as an audio file to the user. Thus, if a user is having difficulty reading the modified article 502, or portions of the article, the user may choose to hear the modified article 502 read audibly.

A dictionary definition 506 for each vocabulary word 504 is provided below the article. A user completing this lesson plan 500 may choose to hear the pronunciation of the vocabulary words 504 by clicking on a speaker icon appearing next to each word in the dictionary definitions 506. Another embodiment of the present invention includes presenting the lesson plan 500 in different languages, such as, for example, Spanish, and in different size fonts for each user. In yet another embodiment of the present invention, the system 100 presents the modified article 502 and the lesson plan 500 in accordance with the level of the user's fluency in a specific language. For example, a user who is learning English may receive a different version of the lesson plan 502 using basic vocabulary, in contrast to a user who is more proficient in the English language and, therefore, would receive the lesson plan 500 as presented in FIG. 5A.

An embodiment of the present invention includes a user with a fourth grade skill level in language arts and literacy receiving a daily lesson plan in an e-mail from his or her evaluator. Upon opening the e-mail, the user accesses the lesson plan 500 and reads through the article 502. Upon completing a review of article 502, the user begins to perform lesson exercises, such as the exercise 506 illustrated in FIG. 5B.

Figure 5B:

The exercise 506 comprises multiple choice questions 508 related to the article 502. In FIG. 5B, a question 508 is posed to the user, with a choice of four answers 510 available for the user's selection. The user may select the appropriate answer 510 and proceed to the next question 512. An aspect of the embodiment includes the system 100 re-assessing the literacy skill level of the user as he or she begins to answer each question 508 by comparing the answer 510 selected by the user to a standard correct answer and considering the time spent in answering the question 508.

Figure 5C:
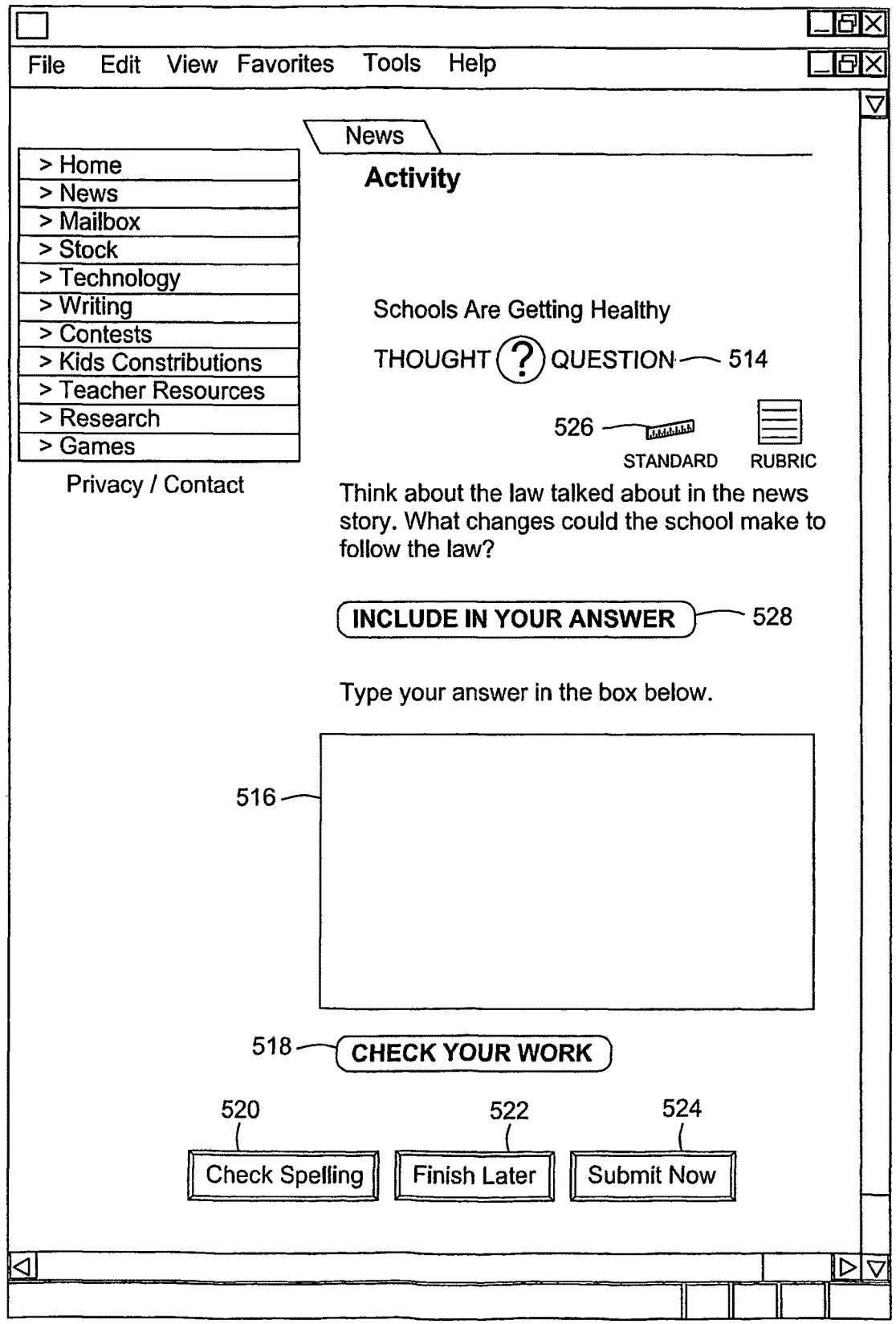

Another lesson exercise is an essay question 514 presented in FIG. 5C. The user may complete the essay in the area 516 provided. While the user is entering his or her answer 516, the system 100 may analyze the answer to re-assess the skill level of the user in real time. An aspect of the embodiment includes analyzing the content of the answer 516 by vocabulary, word frequency, length of the answer 516, sentence length, and length of time spent answering the essay question 514. Another embodiment of the present invention includes the system 100 postponing the analysis of the user's answer 516 after the user submits the answer 516 in its entirety as complete.

In FIG. 5C, the user may check the spelling of the answer 510 using the "Check spelling" option 520. The user also may choose to complete the exercise at a later time by selecting the "Finish Later" option 522, for example, to leave the computer to eat a meal or perform a chore. Once the user has completed his or her answer 516, the user submits the answer 516 to the system 100 using the "Submit Now" option 524.

Prior to submitting a completed answer, the user may check his or her work against a standard answer by selecting the "Check Your Work" option 518. Option 518 allows the system 100 to analyze the answer 516 against a standard correct answer and against the fourth grade level standard in general. The system 100 then may provide immediate feedback to the user regarding the user's answer 516 using the feedback engine 108, allowing the user to modify the answer 516 prior to submitting the answer 516 as complete. An embodiment of the present invention includes providing one or more editing checklists, such as the "Include in Your Answer" checklist 528 provided in FIG. 5C, to the user for guidance for assistance with preparing the essay answer 516.

As shown in FIG. 5C, the user or parent/guardian of a user may view the applicable educational standard by clicking on a standards icon 526. FIG. 5D presents an excerpt 530 of the educational standard used by the system to produce the lesson plan 500.

Figure 5E:
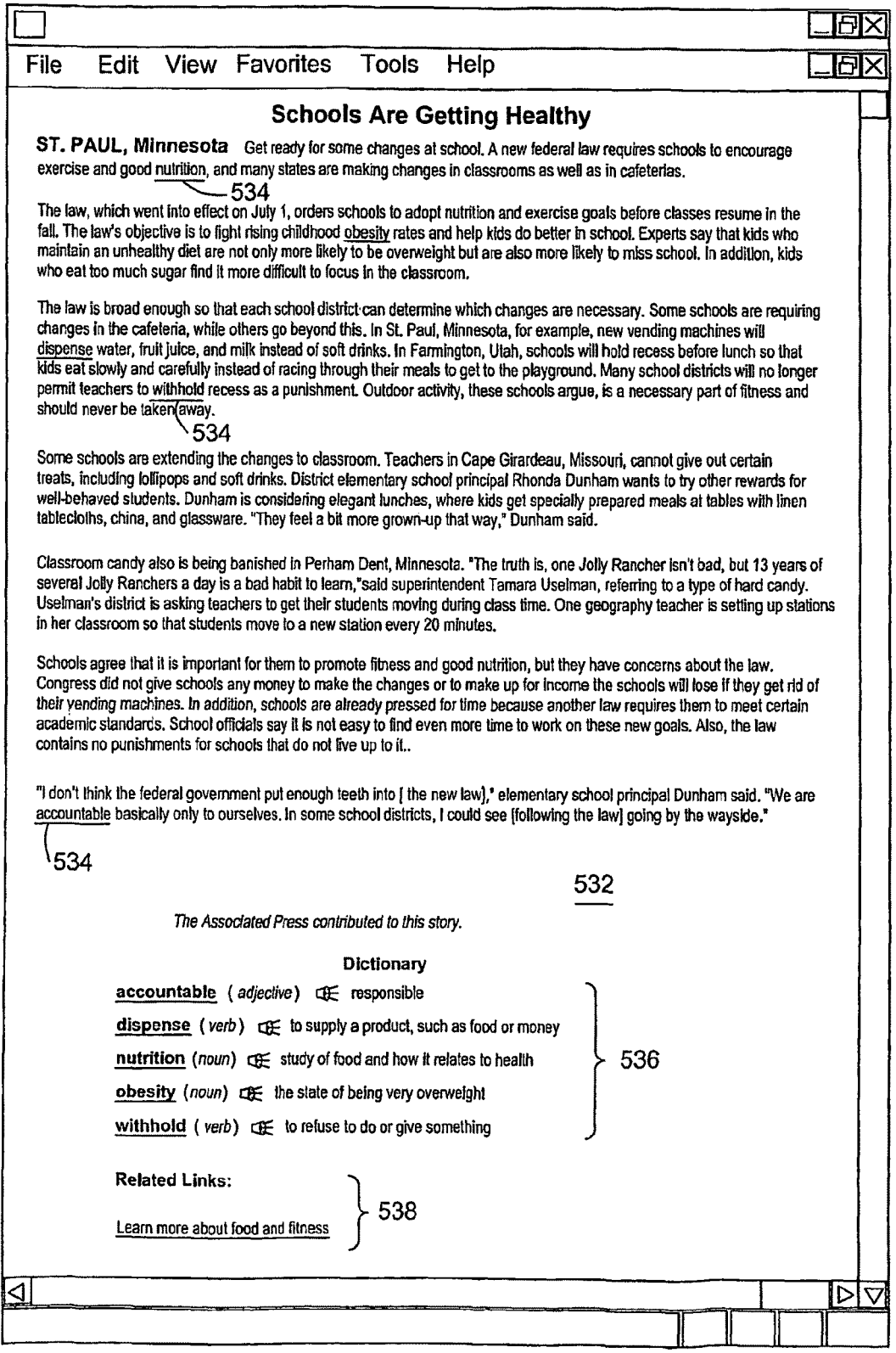

FIG. 5E presents a different version 532 of the original news article used to produce the lesson article 502 in FIG. 5A. The version 532 is aligned to an eighth grade skill level for language arts literacy in accordance with the standards presented in FIG. 5D. The version 532 of the article is longer in length than the version 502 presented in FIG. 5A, and comprises a greater collection of words, longer sentences, and vocabulary words 534 that are more difficult than the vocabulary words 504 illustrated in FIG. 5A.

Similar to the embodiment of FIG. 5A, dictionary definitions 536 of the selected vocabulary words 534 are provided below the article 532. Additional reading material regarding the subject matter of the article 532 may be provided to the user as a link 538. The link 538 may be included in every eighth grade lesson plan covering this specific article. In another embodiment of the present invention, the link 538 is provided in selected eighth grade lesson plans based upon each user's assessed skill level and interests provided in a related user profile.

FIG. 6 presents a progress report 600 produced by a system for producing differentiated content, according to an embodiment of the present invention, such as the system 100 with a feedback application 168, described in the embodiment of FIG. 1. The progress report 600 may be provided to an evaluator of one or more users through an e-mail communication. The system also may store the progress report 600 and provide compile the progress report 600 at the instruction of the evaluator.

In FIG. 6, the progress report 600 provides the performance progress of multiple users 604 in a specific class grade 602 over monthly time periods 608. An embodiment of the present invention provides for the evaluator to request a progress report for a customized period of time, such as, for example, monthly, quarterly, and annually.

Each user 604 is associated with a specific skill level 606 predetermined by the system. For example, in FIG. 6, the portion of the skill level 606 comprising "XXXL" relates to a LEXILE Score as determined by the system. The portion of the skill level 606 preceding the LEXILE Score relates to a grade level or educational standard level associated with each user 604.

The progress report 600 may include a total number 610 of lesson exercises completed by each user 604 within a specific time period, and an average grade 612 for each user 604. The progress report 600 also may provide a class average 616 for each specified time period. A change 614 in a skill level 606 of a user 604 that occurred during the specified time period may be indicated. The progress report 600 allows for the evaluator to efficiently track the performance of each user 604 using a minimum amount of time to prepare the report 600, which provides more teaching time for the evaluator.

FIG. 7 presents another progress report 700 regarding multiple educational standards developed by a system for providing differentiated content, in accordance with an embodiment of the present invention, such as the system 100 described in the embodiment of FIG. 1. The system 100 may use a feedback application to prepare the progress report 700, such as the feedback application 168 described in the embodiment of FIG. 1. The progress report 700 is provided to an evaluator of the group of users 706 and covers a specific curriculum 702, such as language arts, for a specific class grade 704. The users 706 are identified and each user's skill level 708 is provided similarly to the skill level 606 described in the embodiment of FIG. 6.

A total number 710 of questions answered by each user 704 is provided for a specified time period. Subject areas 712 within the curriculum 702 where a user 704 has demonstrated a mastering of the area is provided in regards to a specific standard concept. Subject areas 714 and 716 where additional practice is suggested, and where poor performance is determined, also are provided regarding specific standard concepts. The progress report 700 allows an evaluator to review the performance of each user 704 in relation to specific standard concepts and to determine where immediate help may be needed, or where an increase in skill level may be required, such as where a user 704 has mastered all of the concepts regarding a particular standard.

FIG. 8 presents an analysis report 800 of multiple users' performance in regards to a single educational standard concept 804, in accordance with an embodiment of the present invention. The progress report is provided by a system, such as system 100 with a feedback application 168, as described in the embodiment of FIG. 1, to an evaluator of a group of users 808, and covers a specified curriculum 802, such as language arts, for a sixth grade class 806. The standard concept 804 covers reading comprehension at a specific level as defined by an applicable educational standard.

The class of users 808 is identified by name along with each user's assessed reading skill level 810, similar to the skill levels 606 described in the embodiment of FIG. 6. A number 812 of questions answered by each user 808, where the questions relate to the identified standard concept 804, is provided and a related average score 814 also is provided in the progress report 800.

With respect to each user's performance, the progress report 800 may include recommended practices 816 to an evaluator regarding each user 808 regarding each user's performance. The progress report also may provide additional lesson exercises 818 for one or more users 808, thereby assisting an evaluator in teaching the users 808.

Each of the progress reports described in the embodiments of FIGS. 6, 7, and 8 may be stored in a database by the system 100, such as a performance database 150 described in the embodiment of FIG. 1.

While the foregoing is directed to embodiments of the present invention, other and further embodiments of the present invention may be devised without departing from the basic scope thereof, where the scope thereof is determined by the following claims.

We claim:

1. A computer implemented method for providing differentiated content to a plurality of users, comprising the steps of:
    providing a first set of questions to at least one user using at least one computer;
    receiving a first set of answers related to the first set of questions from the at least one user using at least one computer;
    analyzing the first set of answers to produce a first skill level associated with the at least one user using at least one computer;
    obtaining a first unmodified content from at least one source using at least one computer;
    modifying the first unmodified content in accordance with the first skill level of the at least one user to produce a first modified content using at least one computer;
    associating the at least one user with a skill level group using at least one computer;
    preparing electronic message communications to the user via an electronic message system, wherein a body portion of the electronic message communications are customized to the skill level of the user in addition to the modified content using at least one computer;
    facilitating communications among users within the same skill level group using at least one computer;
    obtaining a first set of educational standards using at least one computer;
    evaluating the first set of educational standards to produce a unique standards code by analyzing at least one of one or more statements of the standards, a structure of the standards, a core meaning of the standards, a related and ancillary meaning of the standards, a learning mode referenced by the standards, an intent of the standards, or related critical thinking, logical, philosophical, and pedagogical elements of the educational standards using at least one computer;
    aligning the first unmodified content to the first set of educational standards to produce a first aligned content in accordance with the unique standards code using at least one computer;
    matching the first aligned content to the first skill level of the at least one user using at least one computer;
    generating a second set of questions related to the first modified content using at least one computer;
    presenting the first modified content and the second set of questions to the at least one user using at least one computer;
    receiving a second set of answers related to the second set of questions from the at least one user using at least one computer;
    analyzing the second set of answers to produce a second skill level associated with the at least one user using at least one computer;
    obtaining a second unmodified content from at least one source using at least one computer; and
    modifying the second unmodified content in accordance with the second skill level to produce a second modified content using at least one computer.

2. The method of claim 1, wherein the first set of educational standards is selected from the group consisting of educational standards, industry training standards, and job performance standards.

3. The method of claim 1, wherein the step of aligning the first unmodified content to the first set of educational standards further comprises the step of using a set of intermediate standards.

4. The method of claim 1, further comprising the step of preparing a first lesson plan using the first modified content, wherein the first lesson plan comprises a set of lesson exercises related to the first skill level.

5. The method of claim 1, further comprising the step of preparing a second lesson plan using the second modified content, wherein the second lesson plan comprises a set of lesson exercises related to the second skill level.

6. The method of claim 1, further comprising the step of preparing a second lesson plan using the first modified content, wherein the second lesson plan comprises a set of lesson exercises related to the second skill level.

7. The method of claim 1, further comprising the step of developing a user profile associated with the user, wherein the user profile comprises user identification information, learning characteristics, personal interests, and the first and second skill levels of the user.

8. The method of claim 1, wherein the step of analyzing the first set of answers to produce a first skill level associated with the user further comprises the step of comparing the first set of answers to a first set of educational standards.

9. The method of claim 1, further comprising the step of delivering the first modified content via an e-mail communication.

10. The method of claim 9, further comprising the step of presenting the e-mail communication in a format associated with the first skill level.

11. The method of claim 1, further comprising the step of delivering the second modified content via an e-mail communication.

12. The method of claim 11, further comprising the step of presenting the e-mail communication in a format associated with the second skill level.

13. The method of claim 1, wherein the first skill level and the second skill level are the same.

14. The method of claim 1, wherein the first skill level and the second skill level are different.

15. The method of claim 1, further comprising the step of providing feedback to the user regarding the analysis of the second set of answers to produce the second skill level.

16. The method of claim 15 further comprising the step of receiving a modified second set of answers based on the feedback provided to the user.

17. The method of claim 16, further comprising the step of analyzing the modified second set of answers to produce a third skill level.

18. The method of claim 1, further comprising the step of delivering the analysis of the first set of answers and the analysis of the second set of answers to an evaluator.

19. The method of claim 18, further comprising the step of receiving a modification to the first skill level by the evaluator.

20. The method of claim 18, further comprising the step of receiving a modification to the second skill level by the evaluator.

21. The method of claim 18, further comprising the steps of:
   receiving a substitute first skill level from the evaluator; and
   replacing the first skill level with the substitute first skill level.

22. The method of claim 1, wherein the first and second unmodified contents are selected from the group consisting of textbooks, news articles, educational lessons, and industry training materials.

23. The method of claim 1, wherein the at least one source is selected from the group consisting of a school database, a news database, an educational database, a proprietary database, and an evaluator.

24. A method for providing content to a plurality of users, where the content provided to each user is the same in information but customized in presentation in accordance with a skill level of each user, comprising the steps of:
   providing a first set of questions to the plurality of users using at least one computer;
   receiving a plurality of first sets of answers related to the first set of questions, wherein each first set of answers is associated with each user of the plurality of users using at least one computer;
   analyzing each first set of answers of the plurality of first sets of answers to produce a plurality of first skill levels, wherein each first skill level is associated with each user using at least one computer;
   obtaining a first unmodified content from at least one source using at least one computer;
   modifying the first unmodified content to produce a plurality of versions of first modified content, wherein each version of first modified content is associated with each first skill level associated with each user using at least one computer;
   associating each user with a skill level group using at least one computer;
   preparing electronic message communications to each user via an electronic message system, wherein a body portion of the electronic communications are customized to the skill level of the user in addition to the modified content using at least one computer;
   facilitating communications among users within the same skill level group using at least one computer;
   obtaining a first set of educational standards using at least one computer;
   evaluating the first set of educational standards to produce a unique standards code by analyzing at least one of one or more statements of the standards, a structure of the standards, a core meaning of the standards, a related and ancillary meaning of the standards, a learning mode referenced by the standards, an intent of the standards, or related critical thinking, logical, philosophical, and pedagogical elements of the educational standards using at least one computer;
   aligning each of the plurality of versions of first unmodified content to the first set of educational standards to produce a first aligned content in accordance with the unique standards code using at least one computer;
   matching the first aligned content to the first skill level of the user using at least one computer;
   generating a plurality of second sets of questions wherein each second set of questions is related to each version of first modified content using at least one computer;
   matching each version of first modified content and each second set of questions to each first skill level associated with each user using at least one computer; and
   presenting each matched version of first modified content and each matched second set of questions to each user of the plurality of users using at least one computer.

25. The method of claim 24, further comprising the steps of:
   receiving a plurality of second sets of answers from the plurality of users, wherein each second set of answers is related to each second set of questions using at least one computer;
   analyzing each second set of answers to produce a plurality of second skill levels, wherein each second skill level is associated with each user using at least one computer;
   obtaining a second unmodified content from at least one source using at least one computer; and
   modifying the second unmodified content to produce a plurality of versions of second modified content, wherein each version of second modified content is associated with each second skill level associated with each user using at least one computer.

26. The method of claim 24, wherein the step of aligning the first unmodified content to the first set of educational standards further comprises the step of using a set of intermediate standards.

27. The method of claim 24, further comprising the step of preparing a plurality of first lesson plans, wherein each first lesson plan relates to each version of first modified content, wherein each first lesson plan comprises a set of lesson exercises related to each first skill level of each user.

28. A computer system for providing differentiated content to a user, comprising:
   at least one central processing unit;
   at least one set of support circuits;
   a first server comprising a differentiation engine, wherein the differentiation engine comprises:
      a profile database for storing a user profile; and
      an assessment application to perform the functions of:
         developing a user profile, wherein the user profile comprises learning characteristics of the user;
         assessing a plurality of skill levels associated with the user; and
         preparing customized content based on the plurality of skill levels; and
   a second server comprising a standards engine communicatively connected with the differentiation engine, wherein the standards engine comprises:

a standards database for storing a plurality of sets of educational standards;

an intermediate standards database for storing a plurality of sets of intermediate standards; and an alignment application to perform the functions of:
obtaining unmodified content;
generating a unique standards identifier for each of the plurality of sets of educational standards, wherein the unique standards identifier corresponds to one or more content elements of each set of educational standards;
applying a set of intermediate standards to align the unmodified content to a set of educational standards from the plurality of sets of educational standards using the unique standards identifier; and a third server comprising a communication engine communicatively connected with the differentiation engine, wherein the communication engine comprises a communication application to perform the functions of:
preparing electronic message communications to the user via an electronic message system, wherein a body portion of the electronic message communications are customized to the plurality of skill levels of the user in addition to the modified content; and
delivering the customized content to the user.

29. The computer system of claim 28, wherein the communication application further performs the function of communicatively connecting the user with other users associated with the system.

30. The computer system of claim 28, further comprising a fourth server comprising a feedback engine communicatively connected with each of the differentiation engine and the standards engine, wherein the feedback engine comprises:
a performance database storing performance and progress data associated with the user; and
a feedback application to perform the functions of:
generating performance and progress data associated with the user based upon a user response to the customized content; and
providing the performance and progress data to the user and to an evaluator.

31. The computer system of claim 28, wherein each of the differentiation engine and the standards engine is stored and maintained on a server.

32. The computer system of claim 28, wherein both the differentiation engine and the standards engine are stored and maintained on a single server.

33. The computer system of claim 28, wherein the differentiation engine communicatively connects to an aligned content database, wherein the aligned content database stores content aligned to a set of educational standards from the plurality of educational standards.

34. The computer system of claim 28, wherein the standards engine communicatively connects to at least one external unmodified content database.

35. The computer system of claim 34, wherein the at least one external unmodified content database comprises unmodified content selected from the group consisting of textbooks, news articles, educational lessons, and industry training materials.

36. The computer system of claim 28, wherein the plurality of sets of educational standards include at least one of a set of educational standards, a set of industry training standards, and a set of job performance standards.

37. A computer system for providing differentiated content to a user comprises:
a central processing unit;
a set of support circuits; and
a server, wherein the server stores and maintains a memory comprising:
at least one operating system;
a differentiation engine;
a communication engine interfacing with the differentiation engine;
a standards engine interfacing with the differentiation engine to analyze a set of educational standards and to align one or more sets of unmodified content with the analyzed set of educational standards based on performance data of at least one user; and
a feedback engine interfacing with the differentiation engine, the communications engine, and the standards engine to provide performance data associated with the at least one user, wherein the communications engine prepares electronic message communications to the user via an electronic message system, wherein a body portion of the electronic message communications are customized to the skill level of the user in addition to the modified content.

38. A computer-readable memory medium storing executable code for implementing a method to provide differentiated content to a user on a computer, wherein the method comprises the steps of:
providing a first set of questions to the user using at least one computer;
receiving a first set of answers related to the first set of questions from the user using at least one computer;
analyzing the first set of answers to produce a first skill level associated with the user using at least one computer;
obtaining a first unmodified content from at least one source using at least one computer;
modifying the first unmodified content in relation to first skill level of the user to produce a first modified content using at least one computer;
associating the user with a skill level group using at least one computer;
preparing electronic message communications to the user via an electronic message system, wherein a body portion of the electronic message communications are customized to the skill level of the user in addition to the modified content using at least one computer;
facilitating communications among users within the same skill level group using at least one computer;
obtaining a first set of educational standards using at least one computer;
evaluating the first set of educational standards to produce a unique standards code by analyzing at least one of one or more statements of the standards, a structure of the standards, a core meaning of the standards, a related and ancillary meaning of the standards, a learning mode referenced by the standards, an intent of the standards, or related critical thinking, logical, philosophical, and pedagogical elements of the educational standards using at least one computer;
aligning the first unmodified content to the first set of educational standards to produce a first aligned content in accordance with the unique standards code using at least one computer;
matching the first aligned content to the first skill level of the user using at least one computer;

generating a second set of questions related to the first modified content using at least one computer;
presenting the first modified content and the second set of questions to the user using at least one computer;
receiving a second set of answers related to the second set of questions from the user using at least one computer;
analyzing the second set of answers to produce a second skill level associated with the user using at least one computer;
obtaining a second unmodified content from at least one source using at least one computer; and
modifying the second unmodified content in relation to the second skill level to produce a second modified content using at least one computer.

39. The computer-readable memory medium of claim 38, wherein the executable code implements at least a subset of the steps of the method in real-time.

40. A computer-readable memory medium storing executable code for implementing a method to provide content to a plurality of users, where the content provided to each user is the same in information but customized in presentation in accordance with a skill level of each user, wherein the method comprises the steps of:
providing a first set of questions to the plurality of users using at least one computer;
receiving a plurality of first sets of answers related to the first set of questions, wherein each first set of answers is associated with each user of the plurality of users using at least one computer;
analyzing each first set of answers of the plurality of first sets of answers to produce a plurality of first skill levels, wherein each first skill level is associated with each user using at least one computer;
obtaining a first unmodified content from at least one source using at least one computer;
modifying the first unmodified content to produce a plurality of versions of first modified content, wherein each version of first modified content is associated with each first skill level associated with each user using at least one computer;
associating each user with a skill level group using at least one computer;
preparing electronic message communications to each user via an electronic message system, wherein a body portion of the electronic message communications are customized to the skill level of the user in addition to the modified content using at least one computer;
facilitating communications among users within the same skill level group using at least one computer;
obtaining a first set of educational standards using at least one computer;
evaluating the first set of educational standards to produce a unique standards code by analyzing at least one of one or more statements of the standards, a structure of the standards, a core meaning of the standards, a related and ancillary meaning of the standards, a learning mode referenced by the standards, an intent of the standards, or related critical thinking, logical, philosophical, and pedagogical elements of the educational standards using at least one computer;
aligning the first unmodified content to the first set of educational standards to produce a first aligned content in accordance with the unique standards code using at least one computer using at least one computer;
matching the first aligned content a produced version of the first unmodified content of the plurality of versions to the first skill level of the user using at least one computer;
generating a plurality of second sets of questions wherein each second set of questions is related to each version of first modified content using at least one computer;
matching each version of first modified content and each second set of questions to each first skill level associated with each user using at least one computer; and
presenting each matched version of first modified content and each matched second set of questions to each user of the plurality of users using at least one computer.

41. The computer-readable memory medium of claim 40, further comprising the steps of:
receiving a plurality of second sets of answers from the plurality of users, wherein each second set of answers is related to each second set of questions using at least one computer;
analyzing each second set of answers to produce a plurality of second skill levels, wherein each second skill level is associated with each user using at least one computer;
obtaining a second unmodified content from at least one source using at least one computer; and
modifying the second unmodified content to produce a plurality of versions of second modified content, wherein each version of second modified content is associated with each second skill level associated with each user using at least one computer.

42. The computer-readable memory medium of claim 40, wherein the wherein the executable code implements at least a subset of the steps of the method in real-time.

* * * * *